(12) United States Patent
Maeda et al.

(10) Patent No.: US 12,109,636 B2
(45) Date of Patent: Oct. 8, 2024

(54) MILLING CUTTER

(71) Applicant: MAKINO MILLING MACHINE CO., LTD., Tokyo (JP)

(72) Inventors: Junichi Maeda, Kanagawa (JP); Takaaki Sugasaki, Kanagawa (JP)

(73) Assignee: MAKINO MILLING MACHINE CO., LTD., Tokyo (JP)

(*) Notice: Subject to any disclaimer, the term of this patent is extended or adjusted under 35 U.S.C. 154(b) by 442 days.

(21) Appl. No.: 17/616,822

(22) PCT Filed: May 26, 2020

(86) PCT No.: PCT/JP2020/020764
§ 371 (c)(1),
(2) Date: Dec. 6, 2021

(87) PCT Pub. No.: WO2020/246318
PCT Pub. Date: Dec. 10, 2020

(65) Prior Publication Data
US 2022/0305573 A1    Sep. 29, 2022

(30) Foreign Application Priority Data

Jun. 7, 2019  (JP) ................. 2019-107239

(51) Int. Cl.
*B23C 5/06*  (2006.01)
*B23C 5/22*  (2006.01)
(Continued)

(52) U.S. Cl.
CPC .............. *B23C 5/2306* (2022.02); *B23C 5/06* (2013.01); *B23C 5/2278* (2013.01); *B23C 5/28* (2013.01);
(Continued)

(58) Field of Classification Search
CPC ... B23C 5/2306; B23C 5/2298; B23C 5/2301; B23C 5/2304; B23C 5/2309;
(Continued)

(56) References Cited

U.S. PATENT DOCUMENTS 777,250 A * 12/1904 Eynon ................ B23C 5/2269
407/41
867,275 A * 10/1907 Hunter ............... B23C 5/2468
407/45
(Continued)

FOREIGN PATENT DOCUMENTS

CH          334736 A  * 12/1958
CN       101282808 A    10/2008
(Continued)

*Primary Examiner* — Ryan Rufo
(74) *Attorney, Agent, or Firm* — Merchant & Gould P.C.

(57) ABSTRACT

A milling cutter (100) comprising: a cartridge (33) that has a tip (32) fixed thereto; a body (10) that has a pocket (15) formed therein into which the cartridge (33) is inserted; and a fixing tool (40) that fixes the cartridge (33), wherein the body (10) has a fixing tool insertion hole (16) that is adjacent to the pocket (15) on the radial direction inner side thereof, and a partitioning wall (17) between the pocket (15) and the fixing tool insertion hole (16), the fixing tool (40) that has been inserted into the fixing tool insertion hole (16) exerts a radial direction outward force on the partitioning wall (17), the pocket (15) is formed so as to produce a counterforce that resists the radial direction outward force acting on the cartridge (33) via the partitioning wall (17), and the cartridge (33) is fixed in the pocket (15) on the basis of the radial direction outward force.

3 Claims, 12 Drawing Sheets

(51) Int. Cl.
  *B23C 5/28* (2006.01)
  *B23C 5/24* (2006.01)
(52) U.S. Cl.
  CPC ...... *B23C 5/2472* (2013.01); *B23C 2210/161* (2013.01); *B23C 2240/245* (2013.01)
(58) Field of Classification Search
  CPC ... B23C 5/2278; B23C 5/2226; B23C 5/2252; B23C 2210/161; B23B 2205/125; B23B 2205/02
  See application file for complete search history.

(56) References Cited

U.S. PATENT DOCUMENTS

| | | | |
|---|---|---|---|
| 1,945,854 A * | 2/1934 | Hall | B23C 5/22 407/41 |
| 1,960,319 A * | 5/1934 | Severson | B23D 77/042 407/50 |
| 2,097,898 A * | 11/1937 | Severson | B23C 5/24 408/203.5 |
| 2,958,119 A * | 11/1960 | Stansfield | B23C 5/2252 407/100 |
| 6,056,484 A | 5/2000 | Mitchell et al. | |
| 6,339,868 B1 * | 1/2002 | Nagaya | B23B 31/1179 279/158 |
| 6,739,807 B2 * | 5/2004 | Robinson | B23C 5/2243 407/41 |
| 8,092,124 B2 | 1/2012 | Spichtinger et al. | |
| 8,485,767 B2 * | 7/2013 | Chen | B23B 31/1179 409/234 |
| 9,211,597 B2 * | 12/2015 | Choi | B23C 5/2269 |
| 10,384,279 B2 * | 8/2019 | Saji | B23C 5/2243 |
| 2002/0110428 A1 | 8/2002 | Noggle | |
| 2003/0133763 A1 | 7/2003 | Kuroda et al. | |
| 2009/0000454 A1 | 1/2009 | Baernthaler et al. | |
| 2011/0164931 A1 | 7/2011 | Ono | |
| 2017/0326659 A1 * | 11/2017 | Saji | B23C 5/06 |
| 2018/0071894 A1 | 3/2018 | Yoshimi et al. | |
| 2020/0356077 A1 * | 11/2020 | Singer-Schnoeller | B23B 27/14 |

FOREIGN PATENT DOCUMENTS

| | | | | |
|---|---|---|---|---|
| DE | 202015103583 U1 * | 9/2015 | | B23B 27/1681 |
| GB | 704133 A * | 2/1954 | | |
| JP | 2001150218 A * | 6/2001 | | B23C 5/242 |
| JP | 2002-331412 A | 11/2002 | | |
| JP | 2003-117717 A | 4/2003 | | |
| KR | 10-2011-0081015 A | 7/2011 | | |
| KR | 10-2018-0015115 A | 2/2018 | | |
| WO | WO-03089203 A1 * | 10/2003 | | |
| WO | 2007/040433 A1 | 4/2007 | | |

* cited by examiner

MILLING CUTTER

This application is a National Stage Application of PCT/JP2020/020764 filed May 26, 2020, which claims benefit of priority to Japanese Patent Application No. 2019-107239, filed Jun. 7, 2019, which applications are incorporated herein by reference. To the extent appropriate, a claim of priority is made to each of the above disclosed applications.

FIELD

The present invention relates to a milling cutter comprising a cartridge to which a tip having a cutting edge is affixed and a body which detachably retains the cartridge.

BACKGROUND

Milling cutters in which a tip is not directly affixed to the body thereof, but a cartridge to which the tip is affixed is housed and affixed in a pocket of the body are known. Such cartridges are conventionally affixed in the pockets of the body by means of lock bolts or clamp pieces. Patent Literature 1 discloses a face milling cutter in which a cartridge (locator) is attached to a pocket formed in the body thereof from the outer peripheral side of the body and affixed by means of a locking bolt.

CITATION LIST

Patent Literature

[PTL 1] Japanese Unexamined Patent Publication (Kokai) No. 2003-117717

SUMMARY

Technical Problem

In general, a milling cutter is provided with a plurality of tips, and it is important to align the cutting edges of the plurality of tips. For example, if the milling cutter is a face milling cutter for finishing, the misalignment of the positions of the plurality of cutting edges in the direction of an axis of rotation (hereinafter, also referred to as "height direction") results in an increased surface roughness of the machined surface Thus, conventionally, a skilled worker adjusts the position of each cartridge in the height direction over a long period of time in order to align the positions of the cutting edges of, for example, 10 or more tips in the height direction. The primary reason for the long period of time is that the cartridges can shift from the desired positions due to the forces or rotational forces exerted when affixing the desirably-positioned cartridges with locking bolts or clamp pieces.

In the case of the milling cutter shown in Patent Literature 1, when the cartridge is affixed in the pocket of the body with a locking bolt, it is considered that positional misalignment of the cartridge and the cutting edge can occur.

The present invention has been achieved in light of the circumstances described above, and aims to provide a milling cutter with which a cartridge can be affixed to the body without causing positional misalignment of the cutting edge.

Solution to Problem

In order to achieve the object described above, according to the present invention, there is provided a milling cutter comprising a cartridge to which a tip having a cutting edge is affixed, a body in which a pocket for insertion of the cartridge is formed, an affixation tool for affixation of the cartridge, and a shank connected to the body, wherein the body has an affixation tool insertion hole formed adjacent to a radial direction inner side of the pocket with respect to an axis of rotation of the milling cutter, and a partition wall between the pocket and the affixation tool insertion hole, the affixation tool inserted into the affixation tool insertion hole of the body exerts a radially-outward force on the partition wall of the body, the pocket is formed so as to produce a counterforce countering the radially-outward force exerted on the inserted cartridge via the partition wall, and the cartridge is affixed in the pocket based on the radially-outward force.

Advantageous Effects of Invention

According to the present invention, since the affixation tool and the cartridge are not in direct contact, even when the cartridge is affixed in the pocket with the affixation tool, forces which change the position and posture of the cartridge are not exerted on the cartridge. Thus, it is possible to avoid a situation in which, for example, the position of the cutting edge of the cartridge, which has been adjusted and positioned to the desired height, changes due to the affixation of the cartridge in the pocket and requires readjustment.

Furthermore, since the pocket is formed so as to generate a counterforce countering the radially-outward force, a wall is formed on the radial outer side of the pocket, and thus, even if the cartridge becomes unlocked for some reason during the high-speed rotation of the milling cutter, the danger of the cartridge disengaging and releasing from the pocket due to centrifugal force is also prevented.

DESCRIPTION OF EMBODIMENTS

A first embodiment of the present invention will be described below with reference to FIGS. 1 to 6.

The milling cutter 100 according to the first embodiment of the present invention is formed as a face milling cutter having a plurality of cutting edges 31, and comprises a body 10 composed of a first plate 11 and a second plate 12, which are disc-shaped, a plurality of cartridges 33 to which tips 32 in which cutting edges 31 are formed are affixed, a plurality of affixation tools 40 for affixation of the cartridges 33 to the body 10, and a shank 50 which is connected to the body 10. The plurality of cartridges 33 are inserted into and retained in respective pockets 15 provided in the body 10. The milling cutter 100 rotates in the direction of arrow B of FIG. 2 centered on the axis of rotation Ra. Note that as used herein, the phrase "radial direction" means the radial direction with respect to the axis of rotation Ra of the milling cutter 100.

In the present embodiment, the milling cutter 100 comprises 12 identical cartridges 33. Note that in FIGS. 1 and 4, for clarification of the drawings, only three cartridges 33 are illustrated. Since the 12 cartridges 33 are identical, in the description below, only a single cartridge 33 will be described. The same is true for the pockets 15 of the first plate 11, the affixation tools 40, etc.

The first plate 11 and the second plate 12 have the same outer diameter as each other, and are coaxially connected to each other by a first bolt 13 inserted from the second plate 12 side. The shank 50 is connected to the second plate 12 by a second bolt 14. The shank 50 has a known tapered portion 51 and a spindle side flange portion 52 formed so as to be mounted on a spindle (not illustrated) of a machine tool, and a body side flange portion 53 attached to a body reference surface 10r. Furthermore, inside the shank 50, a coolant supply passage (not illustrated) penetrates along the axis of rotation Ra.

The cartridge 33 has a tip portion 33a to which a tip 32 is affixed, a columnar intermediate portion 33b which is inserted into the pocket 15 of the body 10, and a base end portion 33c with which a cartridge position adjusting mechanism 60, which is described later, engages. The tip 32 has a triangular shape in the present embodiment, and is affixed to the cartridge 33 with a tip affixation bolt 34 in a state in which it slightly protrudes in the direction of the axis of rotation from the tip portion 33a of the cartridge so that face milling can be performed. In the present embodiment, the radially outer portion of the side on the tip end side of the tip 32 serves as the cutting edge 31.

The first plate 11 has the pockets 15 for retaining the cartridges 33, and affixation tool insertion holes 16 which are rectangular in a plan view and which are provided adjacent to the pockets 15 on the inside thereof in the radial directions. As a result, a partition wall 17 is formed between each pocket 15 and each affixation tool insertion hole 16.

Figure 1:
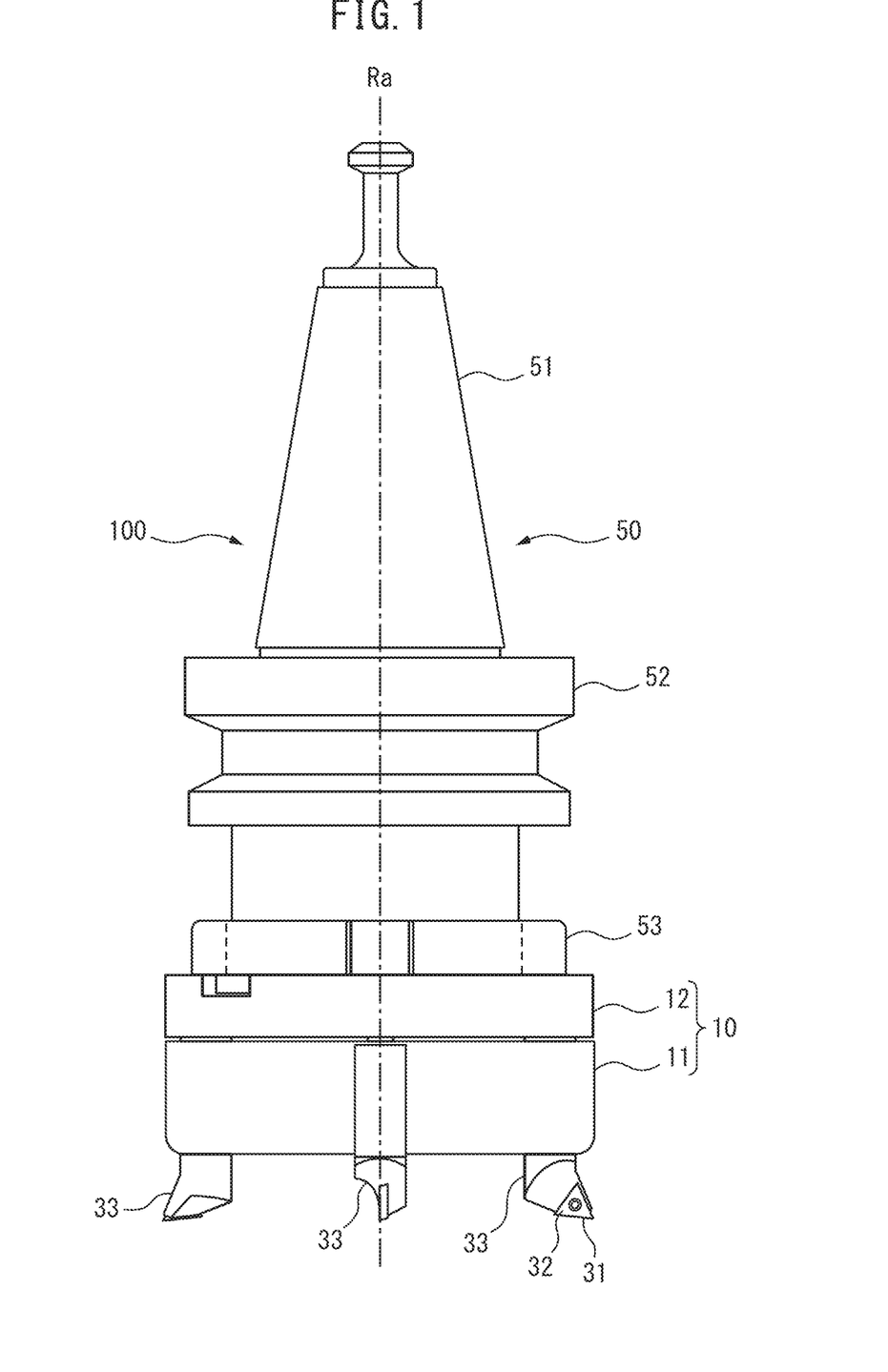
FIG. 1 is a front view of a milling cutter according to a first embodiment of the present invention.
Figure 2:
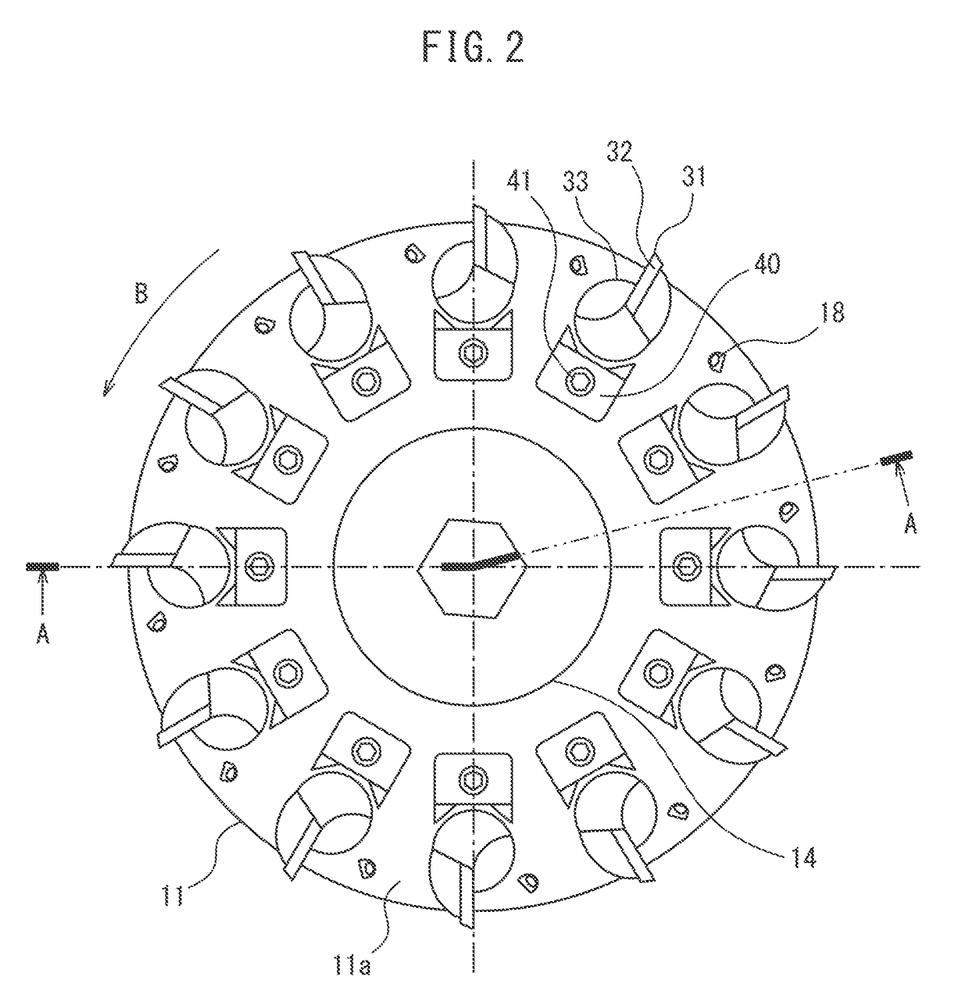
FIG. 2 is a side view of the milling cutter.
Figure 3:
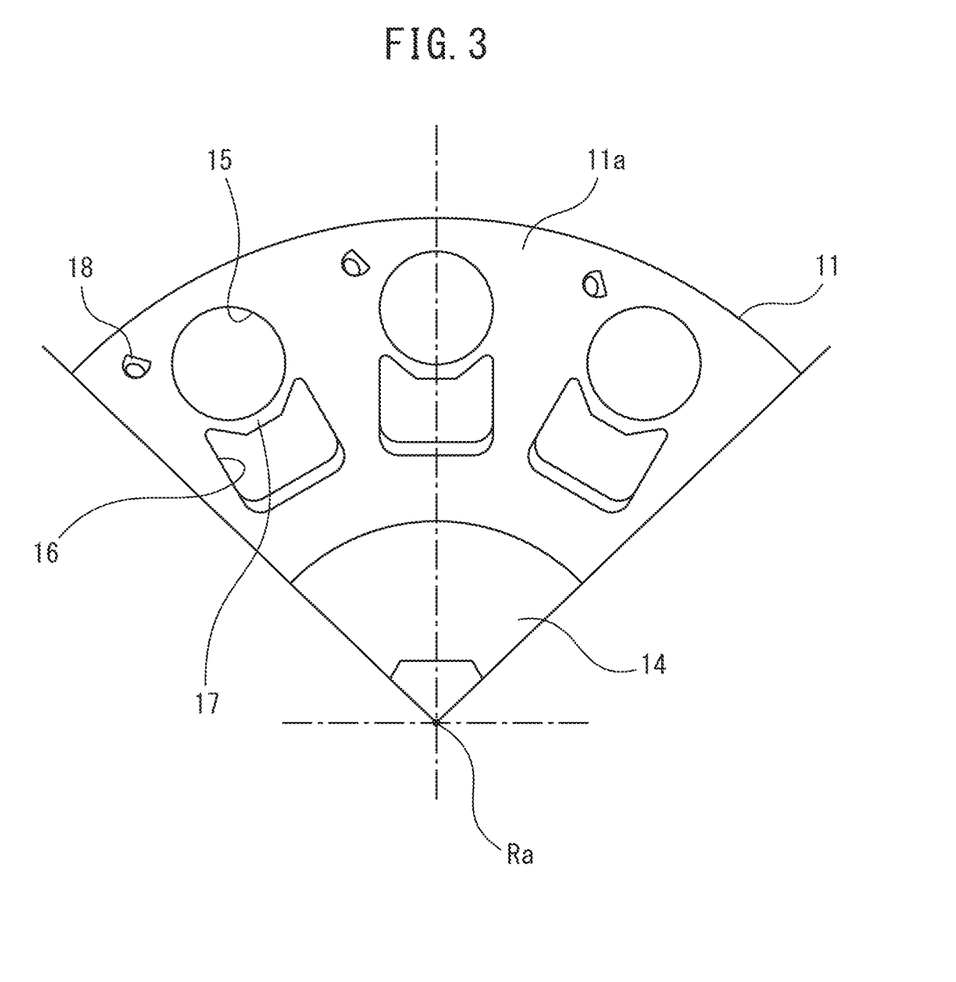
FIG. 3 is a partial enlarged view of FIG. 2, in which the cartridge and affixation tool have been removed.
Figure 4:
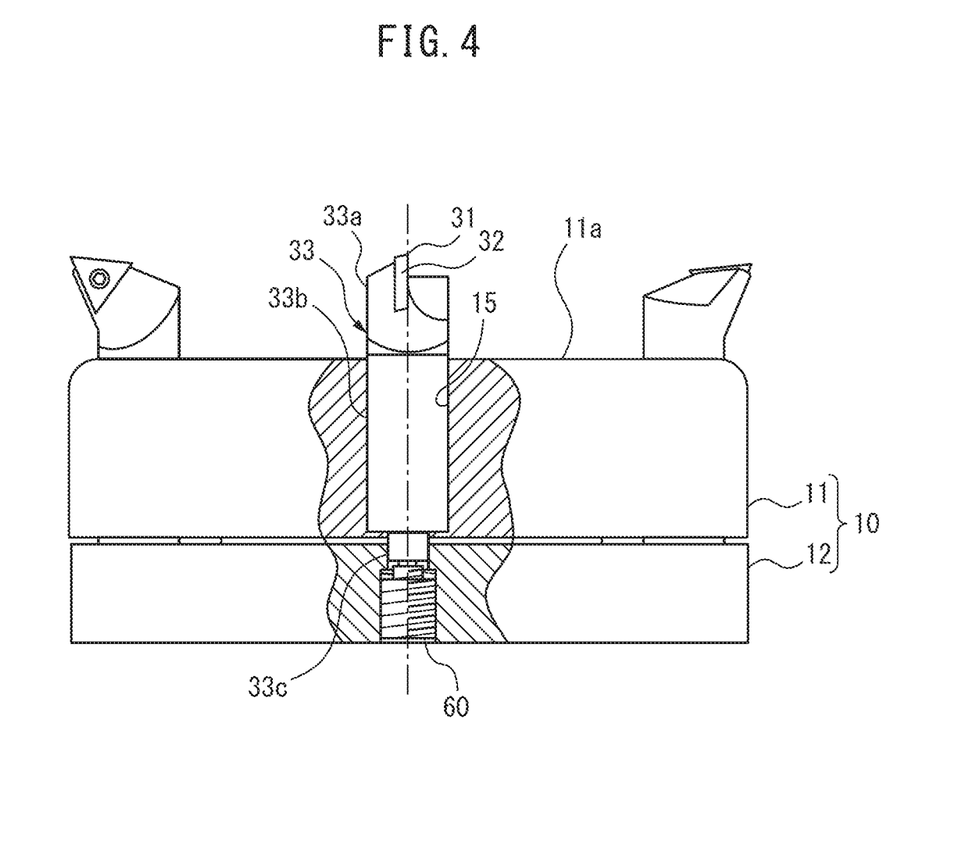
FIG. 4 is a partial longitudinal sectional view of the body of the milling cutter.
Figure 5:
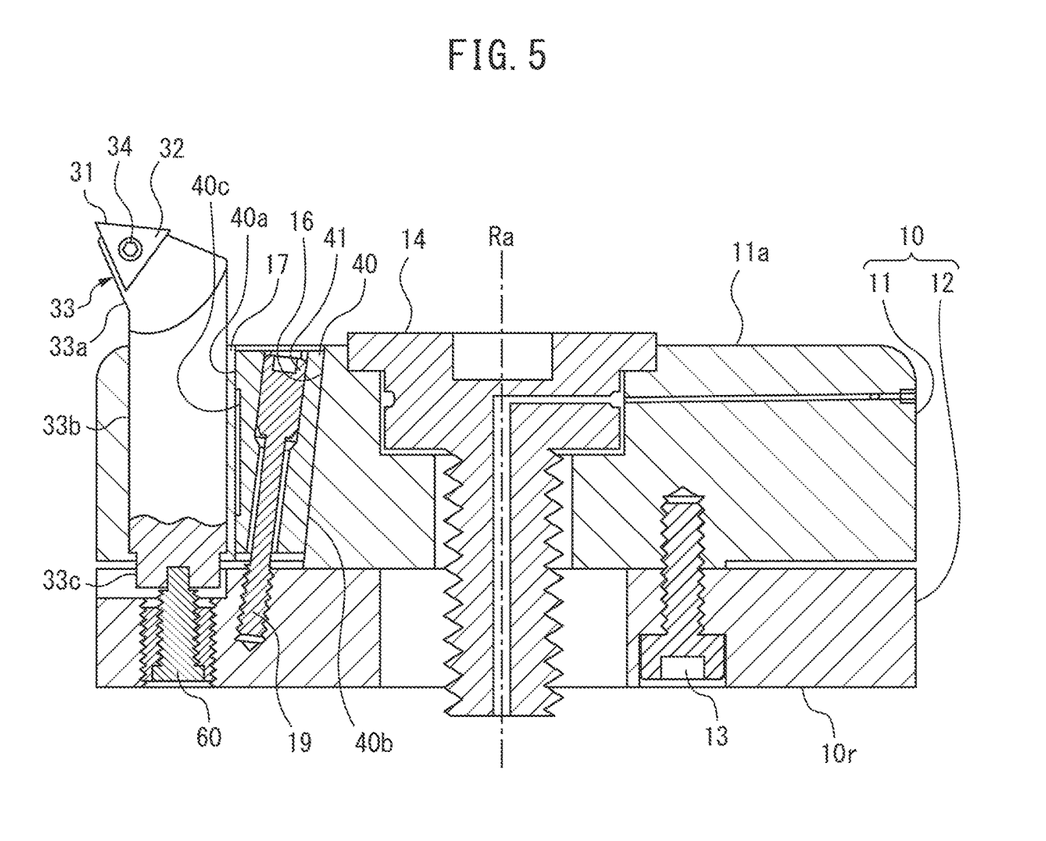
FIG. 5 is a cross-sectional view taken along line A-A of FIG. 2.

The pocket 15 and the affixation tool insertion hole 16 penetrate the first plate 11 in the direction of the axis of rotation. The pocket 15 has a uniform cross-sectional shape which does not change in the direction of the axis of rotation, whereas the affixation tool insertion hole 16 is formed so that the radial direction width thereof becomes narrower as it approaches the second plate 12. Though the shape of the pocket 15 is shown as a circle in FIG. 3, as will be described in detail later, the pocket 15 is formed in a non-circular shape so that a three-point contact state between the pocket 15 and the columnar intermediate portion 33b of the cartridge 33 can be obtained. Note that FIG. 3 is a partially enlarged view of a 90-degree area around the axis of rotation Ra, which is a partially enlarged view of the first plate 11 with the cartridge 33 and the affixation tool 40 removed and viewed from the end face 11a side.

Coolant discharge ports 18 which discharge coolant toward the tips 32 are provided in the end face 11a of the first plate 11. The coolant flows from shank 50 along the central axis of the second bolt 14, is horizontally redirected, flows through the first plate 11, and reaches the coolant discharge ports 18.

In the present embodiment, the affixation tool 40 is formed as a columnar hexahedron having an inclined surface 40b on the radial direction inner side so as to serve as a wedge. The outer side of the affixation tool 40 in the radial direction is formed as a vertical surface 40a, and a recess 40c is formed in the central portion thereof in the vertical direction. A clamp bolt 41 extends through the affixation tool 40 in parallel with the inclined surface 40b. The second plate 12 is formed with a threaded hole 19 into which the threaded portion of the tip of the clamp bolt 41 is screwed. It can be understood from FIG. 5 that by tightening the clamp bolt 41, the affixation tool 40 moves downward, and a radially-outward force acts on the partition wall 17 of the first plate 11, and thus, the force acts on the cartridge 33 inserted into the pocket 15 via the partition wall 17, thereby affixing the cartridge 33 in the pocket 15.

The partition wall 17 is formed relatively thin so as to be deformed and moved outwardly in the radial direction when it receives an outward force in the radial direction from the affixation tool 40. Though the partition wall 17 is formed in a substantially arch shape in the present embodiment, as shown in FIG. 3, various shapes can be adopted. Though the movement of the partition wall 17 is based on the elastic deformation of the partition wall 17 in the present embodiment, it may be based not only on elastic deformation but also on deformation which slides the partition wall 17 in the radial direction.

Figure 6:
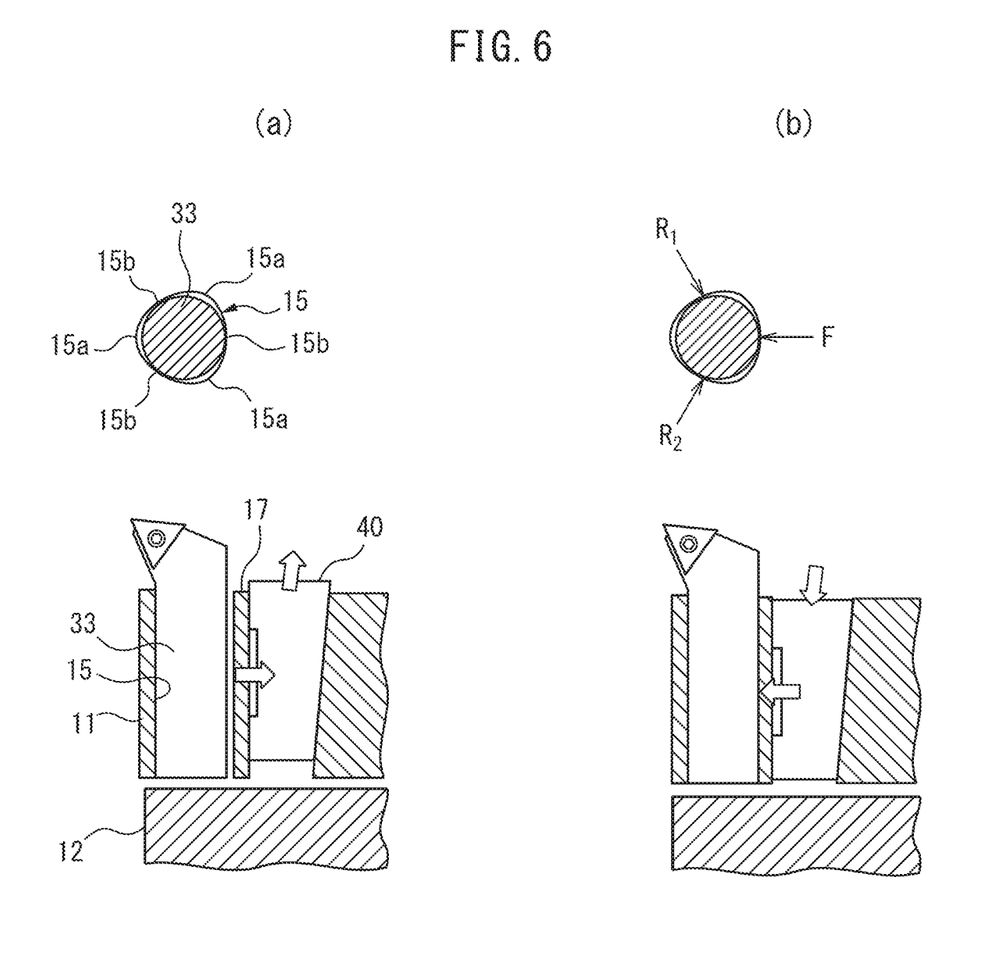
FIG. 6 is a schematic view showing (a) an unclamped state and (b) a clamped state of the cartridge of the milling cutter according to the first embodiment of the present invention.

FIG. 6 shows schematic partial longitudinal-sectional views of the body 10 for detailing (a) an unclamped state and (b) a clamped state of the cartridge 33. At the top of each figure, the outline of the pocket 15 and the cross-section of the cartridge 33 inserted therein are shown. The pocket 15 is formed as a non-circular hole penetrating the first plate 11 in the direction of the axis of rotation. The plan-view shape of the non-circular hole of the pocket 15 can be expressed as a shape in which an equilateral triangle element is enclosed by a circle (hereinafter, referred to as a "curved equilateral triangle" in the present specification), and as shown in the drawings, it consists of three small radius of curvature portions (hereinafter referred to as "curved apexes") 15a arranged at 120 degree intervals and three large radius of curvature portions (hereinafter referred to as "curved edges") 15b therebetween. The radius of curvature of a curved edge 15b is greater than the radius of the cylinder of the cartridge 33. The curved equilateral triangle of the pocket 15 is shaped so that the cartridge 33 is substantially inscribed in the curved edges 15b in the unclamped state and completely inscribed in the clamped state. Thus, the cartridge 33 comes into contact with the inner wall of the pocket 15 at three points when viewed in a cross-sectional view. In FIG. 6, the radii of curvature of the three curved edges 15b are illustrated larger than they actually are in order to emphasize the characteristics of the non-circular hole, which is a curved equilateral triangle.

In the unclamped state of (a), as described above, the cartridge 33 is substantially inscribed in the inner wall of the pocket 15. Though a gap is shown between the cartridge 33 and the inner wall of the pocket 15 in (a) of FIG. 6, this gap is actually 50 microns or less, and thus, is difficult to visually confirm. In the clamped state, as shown in (b), the radially-outward force F acts on the cartridge 33 from the contact point of the curved edge 15b forming the partition wall 17 due to the affixation tool 40, which has been moved downwardly in the drawings. As a result, two reaction forces $R_1$, $R_2$ which oppose the radially-outward force act on the cartridge 33 from their respective contact points on the other two curved edges 15b, thereby affixing the cartridge 33 in the pocket 15 in a stable three-point contact state. Hereinafter, as used herein, the radially-outward force and the two reaction forces which radially oppose it are also referred to as clamping forces. As shown in (b) of FIG. 6, the vectors of the three clamping forces F, $R_1$, and $R_2$ have the same magnitude, extend in directions differing from each other by 120 degrees and intersect at one point.

The cartridge position adjusting mechanism 60 is provided on the second plate 12 so as to face the base end portion 33c of the cartridge 33 for adjusting the position of the cutting edge 31 in the direction of the axis of rotation. The cartridge position adjusting mechanism 60 is composed of two threaded parts, and is configured so that by rotating one threaded part, the other threaded part moves up and down in FIG. 5 without rotating. At the tip of the other threaded part, an engaging portion of a substantially rectangular parallelepiped shape which fits into a groove provided in the base end portion 33c of the cartridge 33 is provided. The other threaded part is arranged in a direction in which the longitudinal direction of the rectangular parallelepiped shape of the engaging portion is orthogonal to the radial direction so that the orientation of the cartridge 33 is determined, and does not change.

The adjustment of the height direction position of the cartridge 33 is carried out prior to affixation of the shank 50 to the body 10 in an unclamped state of the cartridge 33.

According to the milling cutter 100 of the present embodiment, since the affixation tool 40 and the cartridge 33 do not directly contact each other, when the cartridge 33 is affixed in the pocket 15, forces which change the position or posture of the cartridge 33 are not exerted on the cartridge 33, even in the case in which the clamp bolt 41 of the affixation tool 40 is tightly tightened. Thus, for example, a situation in which the position of the cutting edge 31 of the cartridge 33, which has been adjusted to a desired height, is changed by affixation of the cartridge 33 in the pocket 15 and readjustment is required is avoided. Furthermore, the stability of the posture of the cartridge 33 is further enhanced by the three clamping forces F, $R_1$, and $R_2$ generated from the three-point contact state between the cartridge 33 and the inner wall surface of the pocket 15.

Furthermore, since the pocket 15 is formed as a hole, whereby a wall is present in the radially outer side of the pocket 15, even if the cartridge 33 becomes unlocked for some reason during high-speed rotation of the milling cutter 100, the dangerous situation in which the cartridge 33 releases externally (OK?) due to centrifugal forces is avoided. Further, even in the unlocked state, since the affixation tool 40 is pressed against the partition wall 17 by the centrifugal forces, the force for clamping the cartridge 33 is not lost and a situation in which the cartridge 33 protrudes in the direction of the axis of rotation can be avoided.

Furthermore, since the affixation tool 40 is arranged more radially inward than the cartridge 33, the cartridge 33 can be arranged adjacent to the outer peripheral surface of the body 10, and as a result, a large number of cartridges 33 can be arranged in the body 10.

Figure 7:
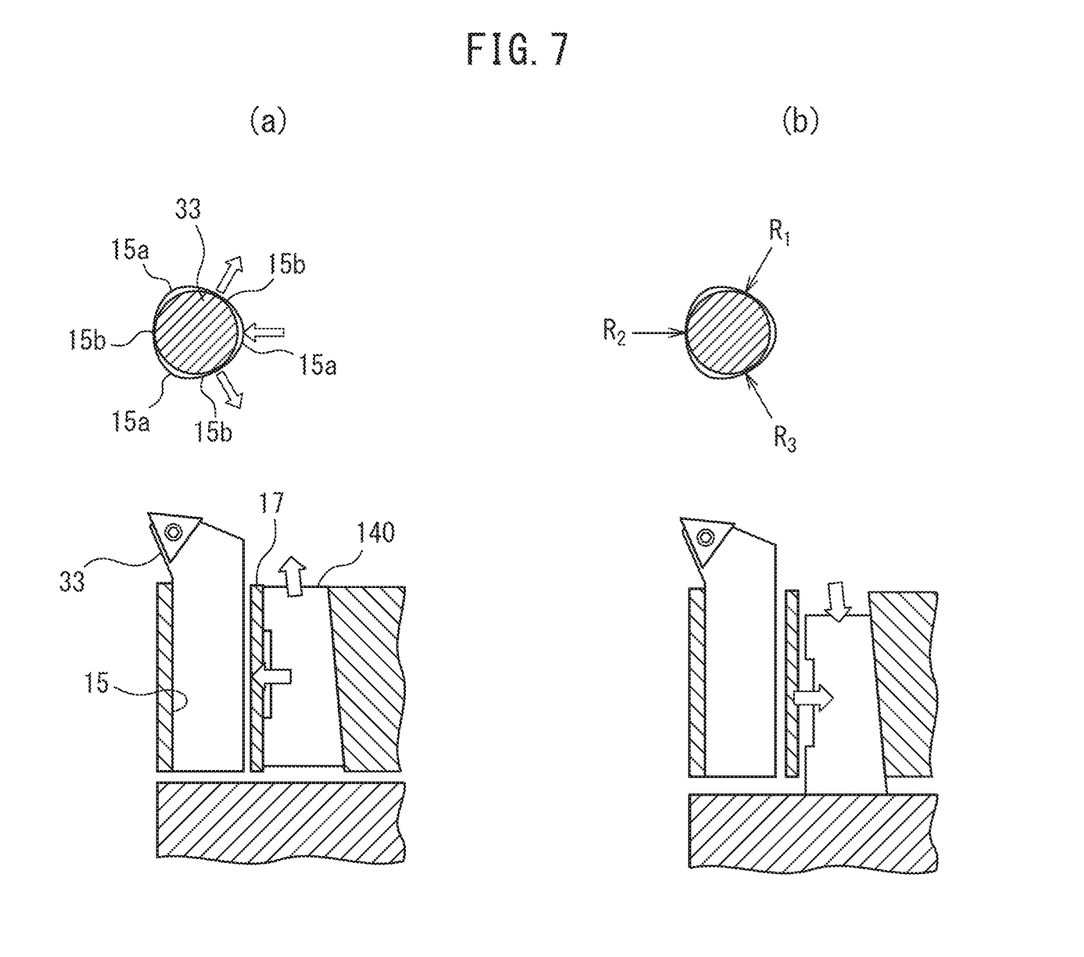
FIG. 7 is a schematic view showing (a) an unclamped state and (b) a clamped state of the cartridge of a milling cutter according to a second embodiment of the present invention.

Next, a milling cutter according to a second embodiment of the present invention will be described below with reference to FIG. 7. FIG. 7 is a drawing similar to FIG. 6 which illustrates the first embodiment, and (a) of FIG. 7 shows an unclamped state of the cartridge 33, and (b) shows a clamped state. The second embodiment differs from the first embodiment in that the unclamped state is obtained by deforming the partition wall 17, and the clamped state is obtained by releasing the deformation of the partition wall 17.

Thus, an affixation tool 140 of the second embodiment is made so that the direction of the inclined surface 140b is opposite to that of the first embodiment. Like the first embodiment, though the shape of the non-circular hole of the pocket 15 in a plan view is a curved equilateral triangle in which the elements of the equilateral triangle are enclosed by a circle, it is rotated 60 degrees from that of the first embodiment, and thus, one curved apex 15a is arranged at the center of the partition wall 17. Furthermore, it also differs from the first embodiment in that the diameter of the inscribed circle of the pocket 15 in the unclamped state is less than the diameter of the cylinder of the cartridge 33.

In the second embodiment, in order to insert the cartridge 33 into the pocket 15, it is necessary to increase the diameter of the inscribed circle of the curved equilateral triangle of the pocket 15. To this end, as shown in (a) of FIG. 7, the affixation tool 140 may be pulled upward in FIG. 7 by a screw mechanism (not illustrated), whereby a radially-outward force may be applied to the partition wall 17. Due to the deformation of the partition wall 17 by the radially-outward force, the two curved edges 15b of the curved equilateral triangle of the pocket 15 are elastically deformed outward, and the diameter of the inscribed circle of the curved equilateral triangle of the pocket 15 is increased.

In the second embodiment, in order to clamp the cartridge 33 inserted into the pocket 15, by moving the affixation tool 140 downward in FIG. 7 by means of a screw mechanism (not illustrated), the radially-outward force acting on the partition wall 17 may be released. Thus, the deformed non-circular hole of the pocket 15 is reduced in diameter, whereby the cartridge 33 and the three curved edges 15b come into contact with each other ((b) of FIG. 7). As a result, the clamping forces $R_1$ to $R_3$ act on the cartridge 33.

Figure 8:
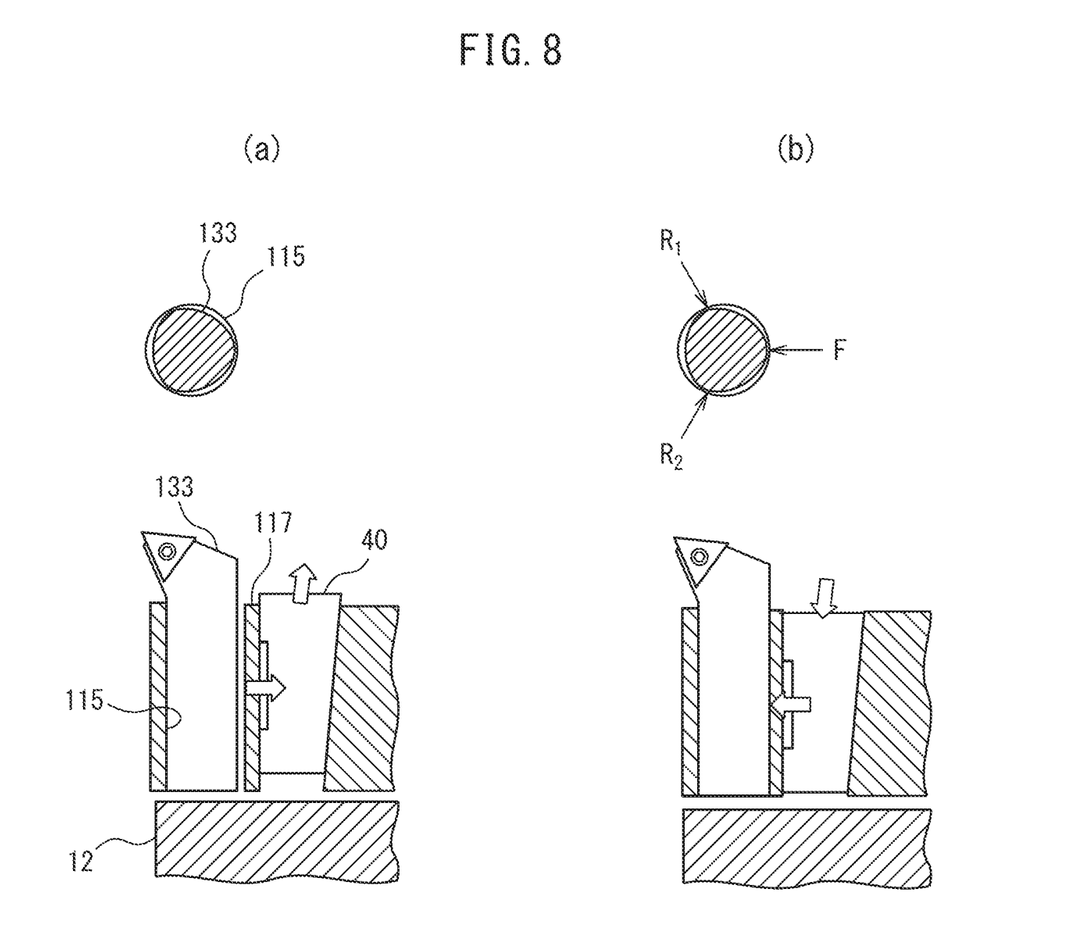
FIG. 8 is a schematic view showing (a) an unclamped state and (b) a clamped state of the cartridge of a milling cutter according to a third embodiment of the present invention.

Next, a milling cutter according to a third embodiment of the present invention will be described below with reference to FIG. 8. FIG. 8 is a drawing similar to FIG. 6 of the first embodiment, in which (a) an unclamped state of a cartridge 133 and (b) a clamped state are shown. In the third embodiment, the cartridge 133 is formed so that the cross-sectional shape of the intermediate portion thereof is a curved equilateral triangle. Conversely, the pocket 115 is formed as a circular hole circumscribing the curved equilateral triangle-shaped cartridge 133.

In the third embodiment, like the first embodiment, by moving the affixation tool 40 downward by means of a screw mechanism (not illustrated), a radially-outward force is applied to the cartridge 133 via the partition wall 117, whereby the three clamping forces F, $R_1$, and $R_2$, including the radially-outward force, are generated at 120-degree intervals, thereby affixing the cartridge 133 in the pocket 115.

Figure 9:
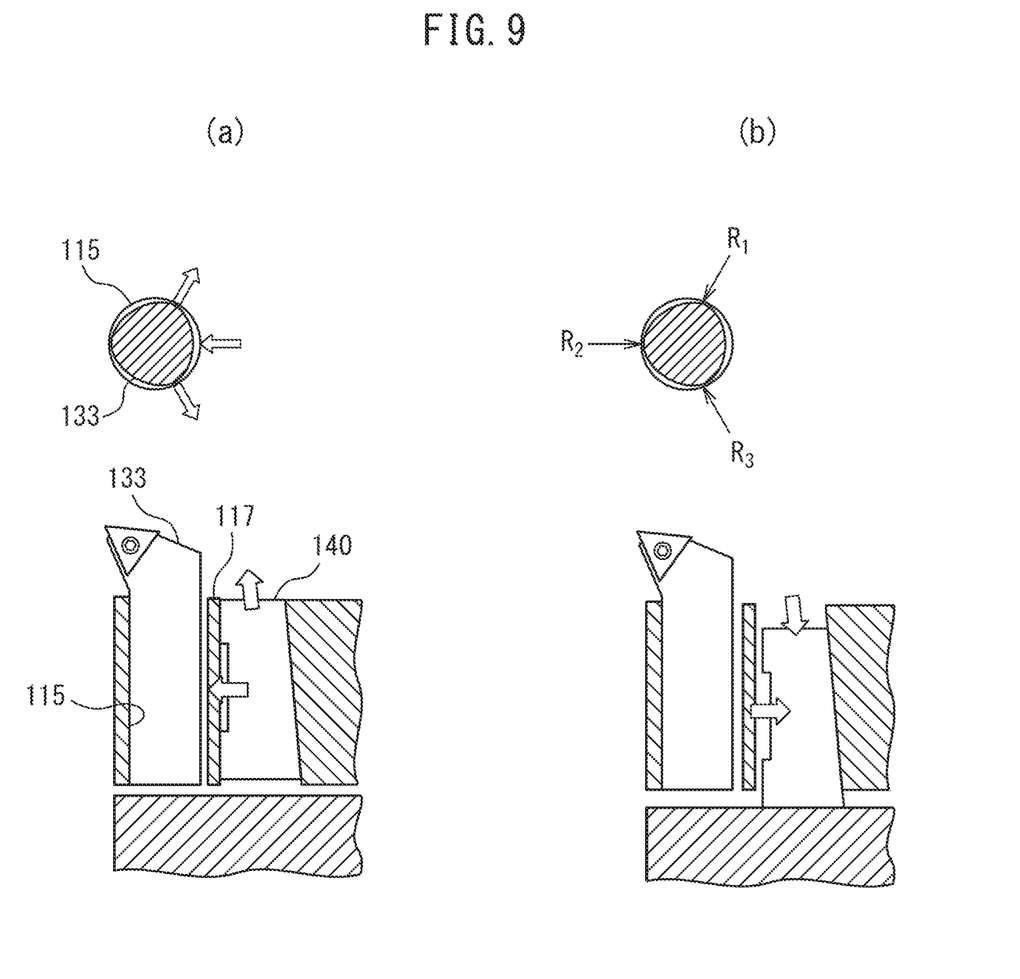
FIG. 9 is a schematic view showing (a) an unclamped state and (b) a clamped state of the cartridge of a milling cutter according to a fourth embodiment of the present invention.

Next, a milling cutter according to a fourth embodiment of the present invention will be described below with reference to FIG. 9. FIG. 9 is a drawing similar to FIG. 7 of the second embodiment, and (a) of FIG. 9 shows an unclamped state of the cartridge 133 and (b) shows the clamped state. In the fourth embodiment, the cross-sectional shape of the cartridge 133 is a curved equilateral triangle in which an equilateral triangle element is enclosed by a circle, like the third embodiment, and the pocket 115 is formed as a circular hole circumscribing the curved equilateral triangle-shaped cartridge 133.

Like the second embodiment, the unclamped state of the fourth embodiment is obtained by pulling the affixation tool 140 upward by means of a screw mechanism (not illustrated) and applying a radially-outward force to the partition wall 117. As in the second embodiment, the clamped state is also obtained by moving the affixation tool 140 downward to release the radially-outward force acting on the partition wall 117.

Figure 10:
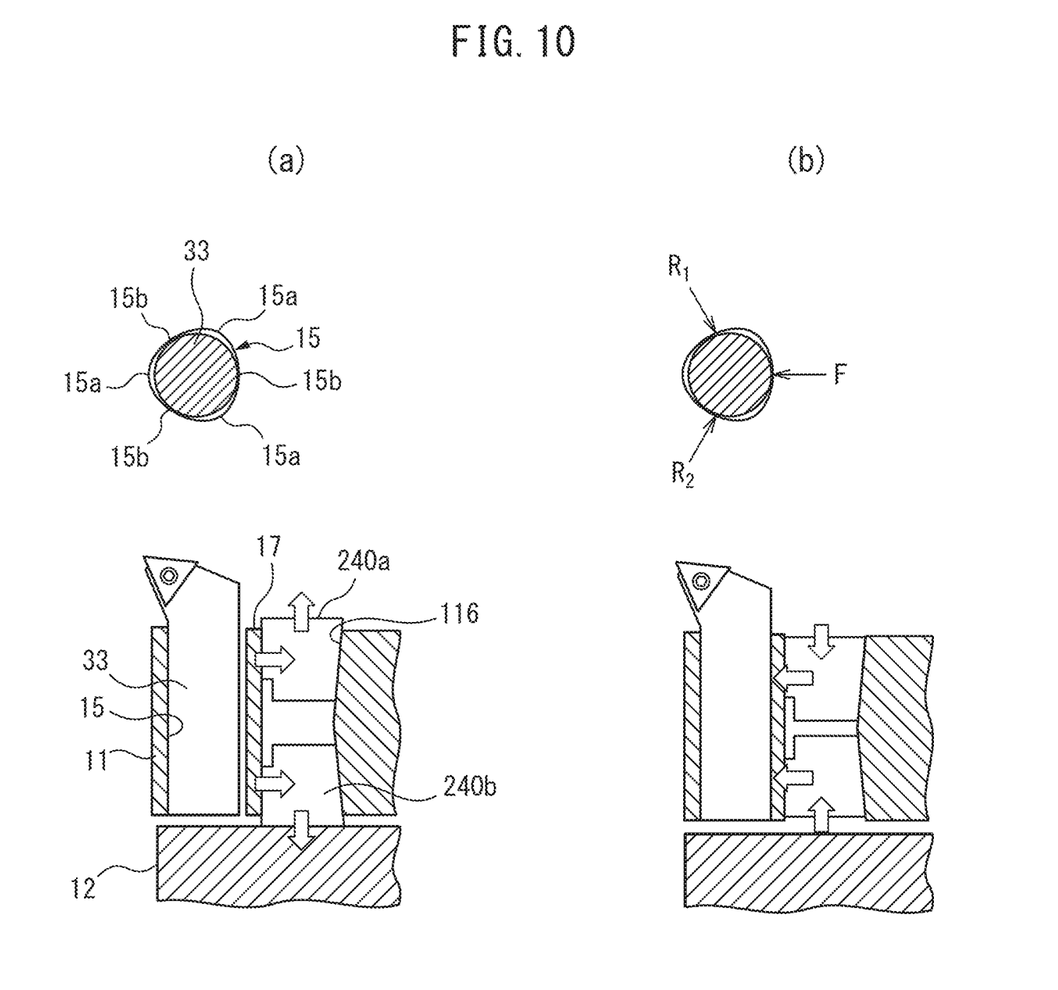
FIG. 10 is a schematic view showing (a) an unclamped state and (b) a clamped state of the cartridge of a milling cutter according to a fifth embodiment of the present invention.

Next, a milling cutter according to a fifth embodiment of the present invention will be described below with reference to FIG. 10. FIG. 10 is a drawing similar to FIG. 6 of the first embodiment, and shows (a) an unclamped state of the cartridge 33, and (b) a clamped state. In the fifth embodiment, the affixation tool is constituted by a pair of affixation tools 240a, 240b.

The pair of affixation tools 240a, 240b have symmetrical contours with respect to the horizontal line in FIG. 10, and are formed so as to be more tapered toward the interior of the affixation tool insertion hole 116. In the fifth embodiment, by moving the affixation tool 240a and the affixation tool 240b in a direction closer to each other by means a screw mechanism (not illustrated), a radially-outward force is applied to the cartridge 33 via the partition wall 117, whereby the clamping forces F, $R_1$, and $R_2$, including the radially-outward force, are generated at 120-degree intervals, thereby affixing the cartridge 33 in the pocket 15.

Figure 11:
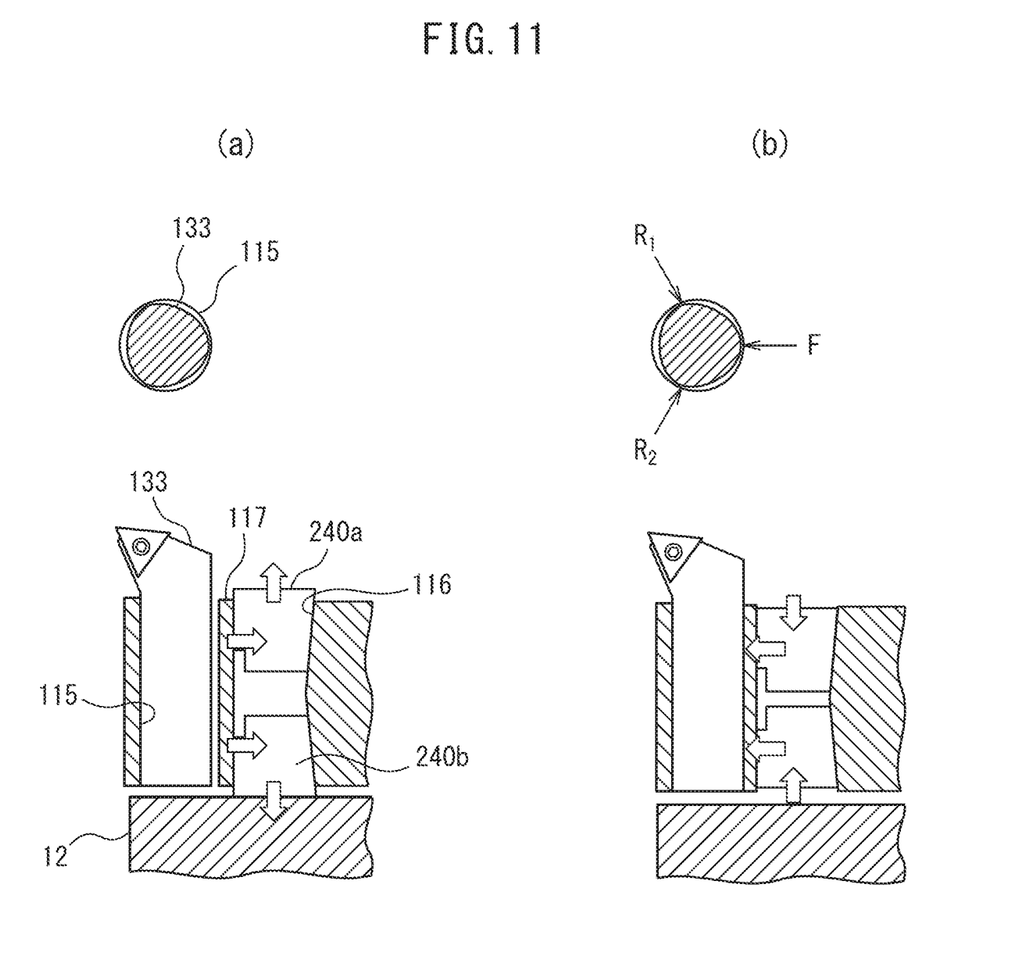
FIG. 11 is a schematic view showing (a) an unclamped state and (b) a clamped state of the cartridge of a milling cutter according to a sixth embodiment of the present invention.

Next, a milling cutter according to a sixth embodiment of the present invention will be described below with reference to FIG. 11. FIG. 11 is a drawing similar to FIG. 8 of the third embodiment, and shows (a) an unclamped state of the cartridge 133 and (b) a clamped state. In the sixth embodiment, the cartridge 133 is formed so that the cross-sectional shape of the intermediate portion thereof is a curved equilateral triangle. Conversely, the pocket 115 is formed as a circular hole circumscribing the cartridge of a curved equilateral triangle. In the sixth embodiment, the affixation tool is the same as that in the fifth embodiment, and is composed of a pair of affixation tools 240a, 240b.

In the sixth embodiment, by moving the affixation tool 240a and the affixation tool 240b in a direction closer to each other by means of a screw mechanism (not illustrated), a radially-outward force is applied to the cartridge 133 via the partition wall 117, whereby the clamping forces F, $R_1$, and $R_2$, including the radially-outward force, are generated at 120-degree intervals, thereby affixing the cartridge 133 in the pocket 115.

Figure 12:
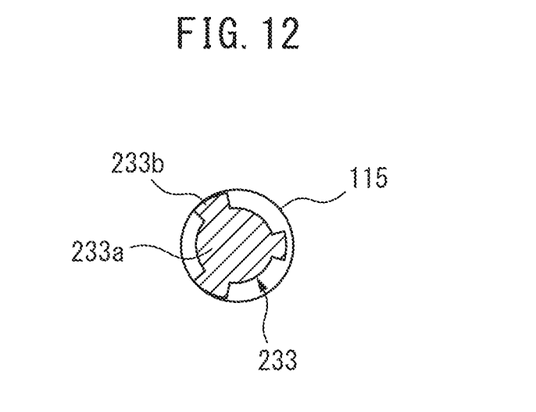
FIG. 12 is a cross-sectional view schematically illustrating an example of a pocket and a cartridge housed therein in the milling cutter according to the present invention.
Figure 13:
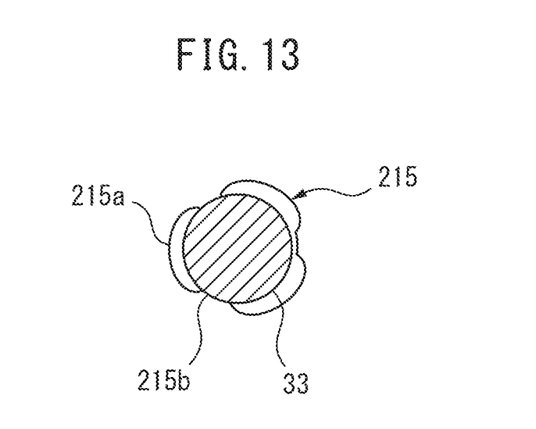
FIG. 13 is a cross-sectional view schematically illustrating another example of a pocket and a cartridge housed therein in the milling cutter according to the present invention.

In the first through sixth embodiments, one of the cross-sectional shape of the intermediate portion of the cartridge and the cross-sectional shape of the hole of the pocket is a curved equilateral triangle, and the other is formed in a circular shape. However, one of the cross-sectional shapes is not limited to a curved equilateral triangle, and any cross-sectional shape can be adopted as long as the other circular shape is inscribed or circumscribed at three points. As illustrated in FIGS. 12 and 13, a shape having a relief portion in which a circular shape is cut out at three points can also be used instead of a curved equilateral triangle. In FIG. 12, the cross-sectional shape of the cartridge 233 has a central circular portion 233a and three protrusions 233b protruding therefrom at 120-degree intervals. In FIG. 13, the cross-sectional shape of the pocket 215 has three small diameter portions 215b provided at 120-degree intervals and inscribed in the circular cartridge 33 and three large diameter portions 215a.

Though the pocket forms a closed space in a plan view in the embodiments described above, an embodiment in which, for example, the radially outside of the pocket is open in a slit shape can also be adopted. In such a case, the width of the slit can be widened as long as two reaction forces which oppose the radially-outward force can be generated thereby.

Though the cross-sectional shape of the pocket or cartridge is composed of a combination of a circular shape and a non-circular shape which contact each other at three points in the embodiments described above, they may contact at more than three points, for example, four points.

Though the milling cutter 100 comprises a cartridge position adjusting mechanism 60 in the embodiments described above, an embodiment of a milling cutter which does not comprise a cartridge position adjusting mechanism 60 can also be adopted. In such a case, the cartridge is clamped when the amount of protrusion of the cutting edge 31 of the cartridge from the end face 11a of the first plate 11 is set to a desired position using, for example, a jig and the hand of an operator.

DESCRIPTION OF REFERENCE SIGNS

10 Body
11 First Plate
12 Second Plate
15 Pocket
16 Affixation Tool Insertion Hole
17 Partition Wall
18 Coolant Discharge Port
31 Cutting Edge
32 Tip
33 Cartridge
40 Affixation Tool
50 Shank
100 Milling Cutter

The invention claimed is:
1. A milling cutter, comprising:
a cartridge to which a tip having a cutting edge is affixed,
a body in which a pocket for insertion of the cartridge is formed,
an affixation tool having an inclined surface and a vertical surface opposite of the inclined surface, and
a shank connected to the body, wherein:
the body has an affixation tool insertion hole formed radially inward from the pocket toward an axis of rotation of the milling cutter such that the affixation tool insertion hole is between the pocket and the rotation axis, and a partition wall is between the pocket and the affixation tool insertion hole,
the affixation tool is inserted into the affixation tool insertion hole of the body with the vertical surface facing the partition wall, and the vertical surface of the affixation tool exerts a radially-outward force on the partition wall of the body in a radial direction opposite to the radially inward direction, thereby elastically deforming the partition wall, the pocket is formed so as to produce a counterforce countering a radially-outward force acting on the cartridge inserted in the pocket via the partition wall, the cartridge is affixed in the pocket based on the radially-outward force acting due to elastic deformation of the partition wall, and in a cross-section perpendicular to the rotation axis, one of the pocket and the cartridge has a non-circular cross-sectional shape and the other of the pocket and the cartridge has a circular cross-sectional shape such that the pocket provides contact portions engaging the cartridge alternating with non-contact portions spaced apart from the cartridge.

2. The milling cutter according to claim 1, wherein cross-sectional shapes of the pocket and the cartridge are such that a three-point contact state between the pocket and the cartridge is established when the radially-outward force acts on the cartridge.

3. The milling cutter according to claim 1, further comprising a cartridge position adjustment mechanism which moves the cartridge axially by rotating a screw part.

* * * * *